Oct. 4, 1966     T. T. HIGHLEY, JR     3,277,408
SYNCHRONOUS CONVERTER WITH ANTI-BOUNCE CHARACTERISTICS
Filed Feb. 8, 1965
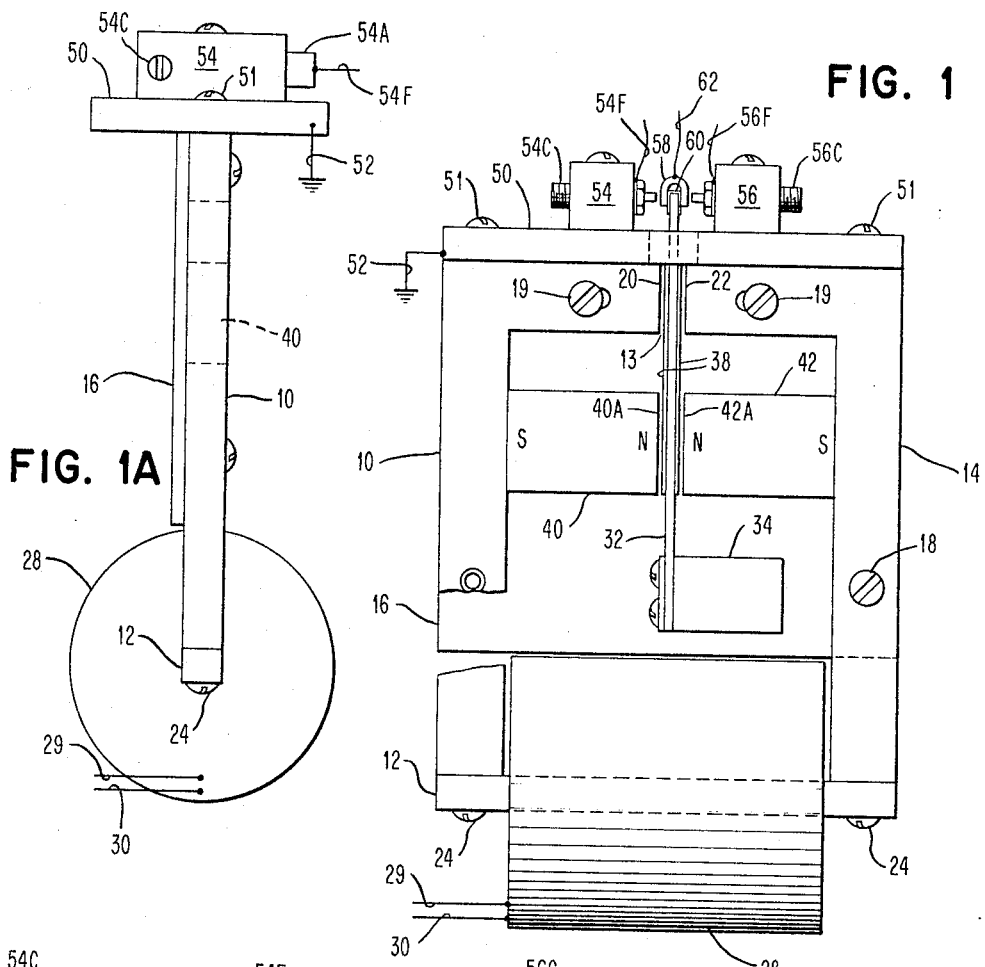
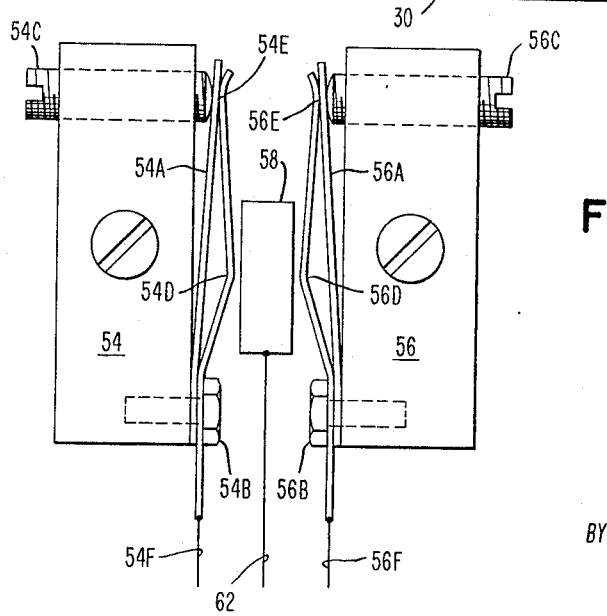
INVENTOR
THOMAS T. HIGHLEY JR.
BY William G. Miller Jr.
AGENT

United States Patent Office 3,277,408
Patented Oct. 4, 1966

3,277,408
SYNCHRONOUS CONVERTER WITH ANTI-BOUNCE CHARACTERISTICS
Thomas T. Highley, Jr., Philadelphia, Pa., assignor to Leeds and Northrup Company, Philadelphia, Pa., a corporation of Pennsylvania
Filed Feb. 8, 1965, Ser. No. 431,012
14 Claims. (Cl. 335—94)

This invention relates to an electrical contact device and more particularly to vibratory synchronous converters which are particularly adapted for converting small unidirectional potentials to alternating potentials at a preselected one of a broad range of frequencies for amplification as is frequently necessary in measurement and control apparatus.

The recent trend toward miniaturization of measurement and control apparatus and other similar apparatus utilizing synchronous converters has made it necessary to decrease as much as possible the size of such units while maintaining or improving their characteristics. It is particularly desirable that the synchronous converters used in measurement and control apparatus should be capable of maintaining a low contact resistance during long continuous periods of operation. It is also desirable that the operation should be such that there is no significant bounce to the contacts, so that the noise level in the output signal from the synchronous converter is minimized and so that satisfactory contact operation over a long period is achieved.

For the widest range of application it is preferred that these synchronous converters should be so constructed as to have a broad frequency range.

It is an object of this invention to provide an improved small synchronous converter having a broad frequency range.

A further object of this invention is the provision of a small synchronous converter having a low contact resistance which can be maintained during long periods of continuous operation.

A still further object of this invention is the providing of a small synchronous converter with extremely low noise levels due to electrostatic pickup.

A further object of this invention is the provision of a small synchronous converter having low noise level due to magnetic pickup.

A further object of this invention is to provide a small synchronous converter with low voltage offsets due to thermal E.M.F.'s generated in the converter.

A still further object of this invention is the provision of a small synchronous converter whose contacts exhibit little or no bounce.

To carry out these objects the present invention utilizes a magnetically soft core arranged to form a magnetic circuit with a small air gap defined by opposing pole faces of the core. A coil linking the core is utilized to alternately polarize the pole faces in synchronism with an alternating current supplied to the coil. The vibrating reed of the converter is also of magnetically soft material and is clamped at one end so that it is allowed to vibrate in the air gap in a direction toward and away from the respective pole faces.

An electrical contact is mounted on the free end of the reed and is insulated therefrom. To provide a means for causing the reed and contact to vibrate, there is provided a unidirectional magnetizing means which is so mounted as to constantly polarize the reed in one polarity. This unidirectional magnetizing means is established in a second magnetic circuit in parallel with the first magnetic circuit. This second magnetic circuit includes not only the unidirectional magnetizing means but also the reed and a portion of the first magnetic circuit adjacent to the air gap. Thus, the polarized reed is caused to vibrate between the two pole faces of the first magnetic circuit as alternating current is applied to the coil of the first magnetic circuit.

Second and third contact elements are positioned so as to make electrical contact with the first contact elements as the first contact element is in different portions of its vibratory cycle. These second and third contact elements include a flat spring bent so as to present to one side of the first contact element a convex face. These flat springs are fixed at one end only and are so oriented that their long dimension is at right angles to the long dimension of the reed. Thus, upon deflection of the reed into contact with the flat spring elements the point of contact between them moves across the face of the flat springs as well as across the surface of the first contact element as the deflection of the reed causes the first contact element to deform the flat springs.

For a more detailed understanding of the invention and for an illustration of a preferred form thereof reference is made to the drawings in which:

FIG. 1 is a front elevation of the vibratory reed converter;

FIG. 1A is a side elevation of the vibratory reed converter;

FIG. 2 is a top view of the contact assemblies of the vibratory converter.

In FIGS. 1 and 1A the soft magnetic core is shown as having three parts—10, 12 and 14. These parts may be constructed of solid pieces or laminations of soft iron which have a high permeability so that a maximum flux density is produced for a given magnetizing current. The similar side portions of the core, namely, sides 10 and 14, are shown as mounted on a mounting plate 16 as by screws 18 and 19. The holes accepting the screws 19 are oblong in shape so as to allow for adjustable positioning of the side core members 10 and 14. This adjustability is desirable so that the air gap 13 between the respective pole faces 20 and 22 can be adjusted to establish the desired air gap length. The mounting plate 16 may, for example, be made of brass or any other nonmagnetic material.

The core member 12 is shown as being fixed in close magnetic coupling with the side members 10 and 14 by screws 24. A drive coil 28 is placed around core member 12 so that it links a first magnetic circuit formed by core members 10, 12 and 14. In normal operation the drive coil 28 will be energized by an alternating current introduced by way of leads 29 and 30.

With the arrangement of the core elements 10, 12 and 14 as shown in FIG. 1, it will be evident that the complete magnetic circuit formed by those elements includes air gap 13 as defined by the pole faces 20 and 22. This magnetic circuit may be considered as having four legs. For example, the portion of the sides 10 and 14 at the top of FIG. 1, which flank the air gap 13 may be considered as a first leg and the member 12 may be considered as an opposing second leg. The remaining portions of the side elements 10 and 14 then make up other opposing legs of the magnetic circuit, and may be considered as the third and fourth legs. It will thus be evident that the first leg with its air gap in conjunction with the second, third and fourth legs make up a complete, closed magnetic circuit designed to present a minimum reluctance consistent with the existence of an air gap therein. This type of magnetic circuit contrasts with the type much used in the prior art wherein the enclosing case of the converter provided a portion of the magnetic circuit. The present arrangement allows for a decrease in the size of the core 28. Such a reduction aids in the miniaturization of the converter.

A vibratory reed 32 of magnetically soft material is shown in FIG. 1 as being fixed by a clamping member 34, the clamping member 34 being rigidly affixed to mounting plate 16. The function of the clamping member 34 is to hold one end of reed 32 fixed in a position interior to the first magnetic circuit while the other end extends into a region exterior to the first magnetic circuit where it is free to vibrate as the reed 32 moves in the air gap 13 between the pole faces 20 and 22. Reed 32 is so oriented that the vibration is toward and away from the respective pole faces 20 and 22.

As shown in FIG. 1, reed 32 is flanked on both sides over a portion of its length by additional strips of magnetically soft material 38 which are affixed to the reed to reduce the reluctance of that portion of the reed between pole faces 20 and 22 and in a second magnetic circuit described later.

Reed 32 is polarized to have a single magnetic polarity at those portions of its surface facing pole faces 20 and 22 by means of permanent magnets 40 and 42 which are mounted in close magnetic coupling with the side portions 10 and 14 of the magnetic core. The permanent magnets 40 and 42 may be affixed to the back plate 16 so that their respective pole faces 40A and 42A are sufficiently spaced so as to allow the reed 32 to vibrate in the air gap therebetween. These permanent magnets provide a unidirectional magnetic field in a second magnetic circuit parallel to the first magnetic circuit. However, the high reluctance of permanent magnets 40 and 42 avoids any significant shunting of the first magnetic circuit.

The polarity of the respective permanent magnets 40 and 42 at the facing pole faces 40A and 42A is shown as being a north polarity in FIG. 1 so that the reed 32 is polarized with the north polarity. It will be obvious that the permanent magnets 40 and 42 could with equal facility be polarized in an opposite polarity it being only necessary that reed 32 be maintained at one fixed polarity.

When alternating current is applied to the input leads 29 and 30 of core 28 the polarity of the pole faces 20 and 22 of the first magnetic circuit formed by core elements 10, 12 and 14 alternate between the north and south polarity. As this alternation occurs the constant north polarity of the reed 32 would cause the reed to vibrate in air gap 13 between pole faces 20 and 22. This vibration will be in synchronism with the alternating current applied at input leads 29 and 30. In order that this synchronism is maintained over a wide range of frequencies the small synchronous converter shown in FIG. 1 is constructed with a reed 32 of small mass by virtue of its short length. Also, the deflection of reed 32 is minimized. It has been found, for example, that with a length of approximately .625 inch for reed 32 a frequency range for the converter of FIG. 1 may be attained at least within the frequency band between 1 cycle per second and 1000 cycles per second with the novel arrangement of elements herein disclosed.

In order to have the small dimensions which allow the broad frequency range above mentioned and at the same time maintain a minimum of electrostatic noise in the output of the converter, it is necessary that the contact assemblies be isolated and shielded as much as possible from the alternating current circuit in coil 28. To this end the present converter utilizes a mounting plate 50 for the contact assemblies. This mounting plate is shown in FIG. 1 as being affixed by screws to respective side portions 10 and 14 of the first magnetic circuit. Plate 50 which is attached to members 10 and 14 by screws 51 extends over the full width of members 10 and 14 and sufficiently beyond so that the desired shielding effect is accomplished when the plate is grounded properly as by way of lead 52. Further shielding is provided by the enclosure of the converter assembly in a metallic container in accordance with well established practices. At the center of the mounting plate 50 an aperture is provided to receive the free end of the reed 32 which extends through and beyond the plate 50 into the region occupied by the contact assemblies 54 and 56. These assemblies are shown as being affixed by screws to plate 50 on a side opposite from the first magnetic circuit.

The free end of reed 32 in the region of contact assemblies 54 and 56 has an electrical contact element 58 mounted thereon but insulated therefrom by the interleaved insulating material 60. Contact element 58 is connected to the output circuit of the converter by lead wire 62.

The contact assemblies 54 and 56 are best described with reference to both FIG. 1 and FIG. 2, like parts having like reference characters in both figures.

The two contact assemblies 54 and 56 are similar in construction each having like elements which will be identified by reference characters having like alphabetical subscripts with the numerical portion of the reference character being the same as the contact assembly with which it is associated. Considering the contact assembly 54A as representative, it will be evident from FIG. 2 in conjunction with FIG. 1 that the flat leaf element or strip 54A is fixed at one end as by screw 54B and has the position of its free end adjusted by the adjusting screw 54C either toward or away from the plane of reed 32. The strip 54A acts as an adjustable friction plate for supporting the free end of contact element 54D in an adjustable position predetermined in accordance with the desired timing of the duration for which the contact element 54D is made with contact element 58.

Contact element 54D is likewise fixed at one end by the clamping screw 54B while the other end of contact element 54D is free to slide on the adjustable friction plate or strip 54A. As shown in FIG. 2 contact element 54D, which might for example be a flat strip of spring metal which is electrically conductive, is bent or formed so as to present to the electrical contact 58 a convex face. It will be evident from FIG. 2 that when reed 32 is displaced to the left contact 58 will make electrical and mechanical contact with contact 54D at its most prominent point and further deflection of reed 32 will cause a deformation of contact element 54D so as to flatten contact spring 54D making it less convex. As the contact element 54D is flattened the point at which it contacts the adjustable friction plate 54A, shown here as a point 54E, will move along the adjustable friction plate 54A if the portion of element 54D between its fixed end and the point at which 54D is contacted by contact 58 is at least as rigid as the remaining portion of element 54D. By making the length of the portion adjacent to the fixed end less than that of the remaining portion and since that dimensional relationship results in a greater included angle between 54D and 54A at the fixed end than exists at the free end, the desired relative motion between contact element 58 and element 54D is obtained. This relative motion may be best described as a wiping action and is of the type more fully described in my copending U.S. patent application Serial No. 384,351, filed July 22, 1964. It is characteristic of this desired wiping action that the point of contact on the contact surface of element 54D should upon contact by contact 58 have a tendency to rotate about an instantaneous center in the plane of that portion of contact 58 adjacent its fixed end at the same time that it has a tendency to move away from the fixed end.

As the free end of contact element 54D moves along plate 54A it will dissipate energy in the form of frictionally developed heat. The provision of this means for the dissipation of energy from the contact element 54D has for a purpose the dissipation of some of the energy which is transmitted by the reed 32 to the contact element 54D so as to minimize any tendency of the contact element 54D to bounce after disengagement from the reed as the reed moves to engage contact 56D.

Contact element 54D is connected to an external circuit by a lead 54F.

Adjusting screws 54C and 56C may be adjusted so that contact elements 54D and 56D are spaced apart by a distance slightly more than the width of contact element 58. Then only a small amount of deflection of reed 32 is required to bring contact 58 alternately into contact with the elements 54D and 56D as in a break-before-make contact arrangement. This alternation of contact between contact 58 and the contact elements 54D and 56D provides alternate connection between lead 62 and leads 54F and 56F. There is thus provided a single-pole, double-throw contact assembly whose contacts operate in synchronism with the alternating current supplied to coil 28.

It will be noted that contact elements 54D and 56D are so oriented as to present the smallest amount of surface facing coil 28. This orientation has the effect of minimizing the electrostatic pickup on contact elements 54D and 56D and thereby minimizing the noise in the output circuit of the converter. It should also be noted that the converter is so arranged that there is a maximum possible spacing between the two contacts 54D, 56D and the magnetic circuits required to set up the vibration of reed 32. This maximizing of the isolation of the contacts from the magnetic circuits serves to reduce as much as possible noise in the output circuit due to magnetic pickup. It will also be found that the orientation of elements shown in FIGS. 1 and 2 is such that there is a significant reduction in thermal noise in the output circuit.

Further additional benefits are derived by the orientation of the contact elements 54D and 56D with their long dimension at right angles to the long dimension of the reed 32 as shown in FIGS. 1 and 2. Such an arrangement has been found to be exceptionally effective to provide a stable low contact resistance between contact 58 and contacts 54D and 56D. This is believed to result from the compound wiping action which results from the combined wiping over the surface of contact 58 by the surface of the contacts 54D and 56D as the respective contacts 54D and 56D are flattened by deflection of the reed 32 which moves contact 58 against the respective contact elements 54D and 56D. The particular characteristics of that wiping action have been explained previously. At the same time that this wiping action occurs, the deflection of reed 32 causes the contact element 58 to move through a slightly arcuate path. This path having a downward component causes the contact 58 to produce a further wiping action in the vertical direction over the surfaces of the contacts 54D and 56D. Thus there is a combination of the wiping action due to deformation of the contacts 54D and 56D and the wiping action due to the downward component of the motion of the contact 58. The latter wiping action being in a direction at right angles to the former. This 90° relationship between these wiping actions provides an enhancement of the overall wiping action between the electrical contacts of the converter so that it has a greater effect than would be present if the 90° relationship did not exist. This enhanced wiping is effective in maintaining a low contact resistance throughout long periods of continuous operation.

In the disclosed arrangement of elements the orientation of the alternating flux in the first leg of the magnetic circuit of FIG. 1, which includes the air gap, is such that there is a minimum tendency to establish an alternating magnetic field in the region of the contact assemblies 54 and 56 in avoidance of pickup by the associated contact elements. This orientation may be compared with another orientation which has the alternating field established in the reed and the unidirectional field established across the air gap. In that orientation the reed itself tends to cause the establishment of alternating fields in the area of the contact assemblies 54 and 56 and is therefore a potential source of noise.

A further benefit provided by the present orientation of parts is a minimization of the overall length and surface area of the contacts 54D and 56D which in addition to the abovementioned factors also tends to reduce electrostatic pickup. This construction by eliminating the stack type of construction, wherein the contacts and the reed are all clamped in a stacked arrangement, avoids the pickup problems attendant with the stack type of construction as well as the assembly problems which are inevitably related to that type of construction.

The present invention provides an orientation of elements which, in addition to other benefits, serves to minimize the voltage offsets frequently established in converter circuits by minimizing the thermal E.M.F.'s generated in the converter structure. This is accomplished by the utilization of such close magnetic coupling in the alternating flux path so that the drive power required is kept at a minimum value thus reducing thermal gradients between the several contact elements 54D, 56D and 58.

It will be evident to those skilled in the art that various modifications may be made of the structural arrangements shown in FIGS. 1 and 2 while still maintaining the novel relationships set forth. One example of such a modification which could be utilized would be the use of the permanent magnet elements not only as a means for polarizing the reed but also as a means for clamping its fixed end.

What is claimed is:

1. A synchronous converter comprising
    a magnetically soft core forming a closed magnetic circuit with a small air gap defined by pole faces of said core,
    a coil linking said core and operable to alternate the polarization of said pole faces in synchronism with the alternation of current energizing said coil,
    a vibratory reed of magnetically soft material,
    means for clamping one end of said reed so as to allow vibration of said reed in said air gap toward and away from said pole faces,
    a first electrical contact element mounted on the other end of said reed and insulated therefrom,
    unidirectional magnetizing means mounted to polarize said reed so that said reed vibrates between said pole surfaces in response to the alternate magnetization of said pole faces, said unidirectional magnetizing means establishing a second magnetic circuit in parallel with said first magnetic circuit and including said reed and a portion of said first magnetic circuit adjacent to said air gap,
    second and third contact elements each positioned to make electrical contact with said first contact element during different portions of the vibratory cycle of said reed, said second and third contact elements each including a flat spring bent to present a convex face to one side of said first contact element, said flat springs being fixed at one end only with their long dimension at right angles to the long dimension of said reed so that upon deflection of said reed into contact with said flat springs said springs tend to deform and the point of contact between said first contact element and said flat springs moves over the face of said first contact element.

2. A synchronous converter comprising
    a magnetically soft core forming a closed magnetic circuit having a small air gap defined by the pole faces of said core,
    a coil linking said core and operable to alternate the polarization of said pole faces in synchronism with the alternation of current energizing said coil,
    a vibratory reed of magnetically soft material,
    means for clamping said reed at one end for vibration of said reed in said air gap toward and away from said pole faces,
    a first electrical contact element mounted on the other end of said reed and insulated therefrom,
    unidirectional magnetizing means mounted to polarize said reed so that said reed vibrates between said pole faces in response to the alternate magnetization of said pole faces, said unidirectional magnetizing means establishing a second magnetic circuit in parallel with said first magnetic circuit and including said reed and a portion of said first magnetic circuit adjacent said air gap, second and third contact elements spaced from the axis of said reed so that the vibratory motion of said reed causes said first contact element to contact alternately said second and third contacts respectively upon opposite deflections of said reed, said second and third contacts being constructed of flexible metal elements fixed at one end so that their long dimension extends from said fixed end at right angles to the axis of said reed and so that they each present a convex face to an opposite side of said first contact element, and adjustable surfaces for positioning the free ends of each of said second and third contact elements so as to adjust the amount of deflection required of said reed before said first contact element contacts said second and third elements to thereby establish a predetermined timing for the contact of said first contact element with said second and third contact elements.

3. A synchronous converter comprising a magnetically soft core forming a magnetic circuit having four legs, an air gap being established in a first of said legs between opposing pole faces of said core, a coil linking a second leg of said core opposite said first leg, said coil being adapted for energization by a source of alternating current, a vibratory reed of magnetically soft material extending from a fixed end interior to said magnetic circuit through said air gap to a free end in a region exterior to said magnetic circuit, said reed being oriented for vibration across said air gap toward and away from said opposing pole faces, a separate permanent magnet interposed between each of a third and fourth opposing legs and said reed, said permanent magnets being positioned so that like poles of each are closely spaced on opposite sides of said reed so that said reed is polarized without impeding its vibration, an electrically conductive non-magnetic plate mounted on said first leg of said magnetic circuit on a side opposite from said second leg, said plate having an aperture for accepting said reed without impeding its vibration, a first electrical contact element mounted on the free end of said reed and insulated therefrom, a leadwire connected to said first contact element, a first and second contact assembly mounted on the side of said plate opposite from said first leg and on opposite sides of said free end of said reed, a contact element on each of said contact assemblies oriented so that said first contact element contacts the contact elements of said assemblies in alternation as the reed vibrates in synchronism with the alternating current supplied to said coil, said last named elements each including a bent flat strip of resilient conductive material having one end only fixed in position so that each of said flat strips presents a convex face to a different side of said first contact element with the edge of said strips facing said coil, a separate leadwire connected to each of said contact elements of said assemblies, a flat friction strip underlying and supporting the free end of each of said last named contact elements with one end of said friction strips being fixed adjacent the fixed end of said contact elements, a means for positioning the free end of each of said friction strips for adjustment of the associated contact element toward and away from the deenergized position of said first contact element to establish the contact timing.

4. A synchronous converter comprising a magnetically soft core forming a magnetic circuit having four legs, an air gap being established in a first of said legs between opposing pole faces of said core, a coil linking a second leg of said core, said coil being adapted for energization by a source of alternating current, a vibratory reed of magnetically soft material extending to a region exterior to said magnetic circuit, said reed being oriented for vibration across said air gap toward and away from said opposing pole faces, a separate permanent magnet interposed between each of a third and fourth opposing legs and said reed, said permanent magnets being positioned so that like poles of each are closely spaced on opposite sides of said reed so that said reed is polarized without impeding its vibration, a first electrical contact element mounted on the free end of said reed and insulated therefrom, a leadwire connected to said first contact element, a first and second contact assembly each including a contact element mounted so that said first contact element contacts the contact elements of said assemblies in alternation as the reed vibrates in synchronism with the alternating current supplied to said coil, said contact elements each including a bent flat strip of resilient conductive material having one end only fixed in position so that each of said flat strips presents a convex face to a different side of said first contact element with the edge of said strips facing said coil, means for adjusting the associated contact elements toward and away from the deenergized position of said first contact element to establish the contact timing.

5. A synchronous converter comprising a magnetically soft core forming a magnetic circuit having four legs, an air gap being established in a first of said legs between opposing pole faces of said core, a coil linking a second leg of said core opposite said first leg, said coil being adapted for energization by a source of alternating current, a vibratory reed of magnetically soft material extending from a fixed end interior to said magnetic circuit through said air gap to a free end in a region exterior to said magnetic circuit, said reed being oriented for vibration across said air gap toward and away from said opposing pole faces, a separate permanent magnet interposed between each of a third and fourth opposing legs and said reed, said permanent magnets being positioned so that like poles of each are closely spaced on opposite sides of said reed so that said reed is polarized without impeding its vibration, an electrically conductive nonmagnetic plate mounted on said first leg of said magnetic circuit on a side opposite from said second leg, said plate having an aperture for accepting said reed without impeding its vibration, a first electrical contact element mounted on the free end of said reed and insulated therefrom, a first and second contact assembly mounted on the side of said plate opposite from said first leg and on opposite sides of said free end of said reed, a contact element on each of said contact assemblies, said last named elements each including a bent flat strip of resilient conductive material having one end only fixed in position so that each of said flat strips presents a convex face to a different side of said first contact element with the edge of said strips facing said coil, a surface for supporting each of said strips at its free end for frictional engagement with said strips during the period when said strips are deformed by contact with said first contact.

6. A synchronous converter comprising
a magnetically soft core forming a magnetic circuit having four legs, an air gap being established in a first of said legs between opposing pole faces of said core,
a coil linking a second leg of said core opposite said first leg, said coil being adapted for energization by a source of alternating current,
a vibratory reed of magnetically soft material extending from a fixed end interior to said magnetic circuit through said air gap to a free end in a region exterior to said magnetic circuit, said reed being oriented for vibration across said air gap toward and away from said opposing pole faces,
a separate permanent magnet interposed between each of a third and fourth opposing legs and said reed, said permanent magnets being positioned so that like poles of each are closely spaced on opposite sides of said reed so that said reed is polarized without impeding its vibration,
a first electrical contact element mounted on the free end of said reed and insulated therefrom,
a leadwire connected to said first contact element,
a first and second contact assembly,
a contact element on each of said contact assemblies mounted so that said first contact element contacts the contact elements of said assemblies in alternation as the reed vibrates in synchronism with the alternating current supplied to said coil,
said elements of said assemblies each being a bent flat strip of resilient conductive material having one end only fixed in posiiton so that each of said flat strips presents a convex face to a different side of said first contact element,
a flat friction strip underlying each of said last named contact elements with one end of said friction strips being fixed adjacent the fixed end of said contact elements of said assemblies and the other end of said friction strips supporting the free ends of said assembly contact elements,
a means for positioning each of said friction strips toward and away from the deenergized position of said first contact element.

7. A synchronous converter comprising
a magnetic circuit including an air gap defined by opposing pole faces,
a vibratory reed of high permeability mounted for vibration in said air gap,
a first contact mounted on the free end of said reed,
means for magnetizing said pole faces and said reed so that said reed is alternately urged toward one of said pole faces and then the other at a predetermined frequency, and
a second contact of resilient strip material bent to form a convex surface and mounted so that said surface is flattened by said first contact upon deflection of said reed, said strip having the axis along which it is flattened at right angles to that axis of said reed which is deflected whereby said first and second contacts exert an enhanced wiping action one upon the other to maintain a low contact resistance therebetween.

8. A synchronous converter comprising
a first magnetic circuit energizable by alternating current to provide an alternating polarization of an air gap in said magnetic circuit,
a second magnetic circuit in parallel with said first magnetic circuit and having a constant predetermined polarity,
a vibratory reed of magnetically soft material mounted for vibration in said air gap, said vibratory reed forming a portion of said second magnetic circuit,
a first electric contact element mounted on the free end of said reed,
a second and third contact of flexible strip material each shaped to form a convex surface facing said first contact and having one fixed end, the said flexible strips extending at right angles to said reed, whereby upon deflection of said reed said first and said second and third contacts alternately provide electrical connections such that the contact resistance is maintained at a low value.

9. A synchronous converter of the nonresonant type comprising
a magnetic circuit energizable by alternating current to provide an alternating polarization at pole faces defining an air gap therein,
another magnetic circuit having a portion common to said first mentioned magnetic circuit and having a constant predetermined polarity maintained therein,
a vibratory reed of magnetically soft material mounted for vibration in said air gap, said vibratory reed forming a portion of said other magnetic circuit,
a first electric contact mounted on the free end of said reed and insulated therefrom,
a second and third contact of flexible conductive strip material each shaped to form a convex surface facing said first contact and having one fixed end, said flexible strips extending at right angles to said reed,
means for supporting the free end of said flexible strips so that said free ends may dissipate energy in the form of heat of friction as they slide along said support means when said first contact is operable to deform said second and said third contact and also when said first contact leaves said second contact.

10. A synchronous converter comprising
a magnetic circuit including an air gap defined by opposing pole faces,
a vibratory reed mounted for vibration in said air gap,
a first contact mounted at the free end of said reed,
means for magnetizing said pole faces and said reed so that said reed is alternately urged toward one of said pole faces and then toward the other at a predetermined synchronous rate, and
a second and third contact each of resilient strip material having one fixed end and one free end, said strips between said fixed and said free ends having an angular bend projecting a portion of said strips at said bend toward said first contact,
means for supporting said free ends of said second and said third contact, said support frictionally engaging said free ends of said second and said third contacts as said second and third contacts are alternately flattened upon deflection of said reed to cause said first contact to physically engage said second and said third contacts whereby a substantial portion of the energy transmitted to said second and third contacts is absorbed in avoidance of any tendency of said second and third contacts to bounce.

11. A synchronous converter comprising
a magnetic circuit including an air gap defined by opposing pole faces,
a vibratory reed of high permeability mounted for vibration in said air gap,
a first contact mounted at the free end of said reed,
means for magnetizing said pole faces and said reed, so that said reed is alternately urged toward one of said pole faces and then toward the other at a predetermined synchronous rate,
a second and third contact each of resilient strip material bent to form a convex surface and mounted so that said surface is flattened by said first contact upon deflection of said reed, said strips each having the axis along which it is flattened by said first contact at right angles to that axis of the reed which is deflected during its vibration, a flat strip underlying each of said second and third contacts at its free end and frictionally engaging said free ends so as to absorb energy from said second and third contacts as said first contact alternately disengages said second and third contacts.

12. A synchronous converter comprising,
a magnetically soft core having an air gap defined by opposing pole faces,
a coil linking said core and operable to alternate the polarization of said pole faces in synchronism with the alternation of current in said coil,
a vibratory reed of magnetically soft material having one end constrained from movement, the other end of said vibratory reed extending through said air gap, said other end being free to vibrate in said air gap,
means for establishing a magnetic circuit including a portion of said reed and a portion of said core, said means being operable to provide a constant unidirectional magnetomotive force,
a first electrical contact mounted on the free end of said reed and insulated therefrom,
second and third contact elements each positioned to make electrical contact with said first contact element during alternate half cycles of the vibration of said reed, said second and third contact elements each including a resilient flat spring so bent that it presents a convex face to one side of said first contact element, said flat spring being fixed at one end and oriented to have its long dimension at right angles to the long dimension of said reed, the free end of said flat spring being biased against a surface whereby the flattening of said second and third contact elements by the action of said first contact element causes a portion of the energy thereby transmitted to be absorbed by the friction between the free end of said flat springs and said supporting surface.

13. A synchronous converter comprising
a vibratory reed having a fixed end,
a magnetic means for establishing a vibration of said reed at a predetermined frequency,
a first electrical contact surface associated with the free end of said reed,
an electrical contact assembly positioned to be contacted by said first contact surface of said reed to establish an electrical circuit therebetween upon deflection of said reed,
said contact assembly including a resilient elongated member carrying a second contact surface intermediate between its ends and having one end only fixed, said elongated member being so shaped and positioned as to present a convex surface facing said first contact surface of said reed with its free end engaging a surface so that as said reed is deflected to bring said first contact surface into contact with said second contact surface said elongated member is deformed so that the point of contact between said contact surfaces moves over both of said surfaces.

14. A synchronous converter comprising
a magnetic circuit including an air gap defined by opposing pole faces,
a vibratory reed mounted for vibration in said air gap,
a first contact mounted at the free end of said reed,
means for magnetizing said pole faces and said reed so that said reed is alternately urged toward one of said pole faces and then toward the other at a predetermined synchronous rate,
a second and third contact each of resilient strip material having one fixed end and one free end, said strips between said fixed and said free ends having an angular bend projecting a portion of said strips at said bend toward said first contact, and
a surface for continuously supporting in frictional engagement said free ends of said second and said third contacts as said second and said third contacts are alternately engaged and disengaged by said first contact upon deflection of said reed whereby a substantial portion of the energy transmitted to said second and said third contacts is absorbed in avoidance of any tendency of said second and third contacts to bounce.

References Cited by the Examiner
UNITED STATES PATENTS

| | | | |
|---|---|---|---|
| 3,029,326 | 4/1962 | Fischer | 200—90 |
| 3,128,357 | 4/1964 | Hartig | 200—93 |

References Cited by the Applicant
UNITED STATES PATENTS

| | | |
|---|---|---|
| 2,636,094 | 4/1953 | Russell. |
| 2,677,093 | 4/1954 | Maltby. |
| 2,866,028 | 12/1958 | Russell. |
| 2,877,319 | 3/1959 | Bostwick et al. |
| 2,960,585 | 11/1960 | Russell. |
| 2,960,586 | 11/1960 | Russell. |
| 3,045,089 | 7/1962 | Russell. |
| 3,146,327 | 8/1964 | Yoshitami Ohki et al. |
| 3,156,798 | 11/1964 | Rights. |

BERNARD A. GILHEANY, *Primary Examiner.*
R. N. ENVALL, JR., *Assistant Examiner.*